(12) United States Patent
Morgan

(10) Patent No.: US 6,553,822 B2
(45) Date of Patent: Apr. 29, 2003

(54) LIQUID VOLUME MEASUREMENT

(76) Inventor: Bert Morgan, 355 Beaver Head Rd., Ronan, MT (US) 59864

( * ) Notice: Subject to any disclaimer, the term of this patent is extended or adjusted under 35 U.S.C. 154(b) by 0 days.

(21) Appl. No.: 09/927,726

(22) Filed: Aug. 11, 2001

(65) Prior Publication Data

US 2003/0029236 A1 Feb. 13, 2003

(51) Int. Cl.⁷ .............................................. G01F 17/00
(52) U.S. Cl. ........................................... 73/147; 73/299
(58) Field of Search .......................... 73/299, 300, 302, 73/744, 149

(56) References Cited

U.S. PATENT DOCUMENTS

| | | | | |
|---|---|---|---|---|
| 2,455,200 A | * | 11/1948 | Wallace | 73/299 |
| 3,319,571 A | * | 5/1967 | Schaefer | 103/25 |
| 3,398,394 A | * | 8/1968 | Luehrmann et al. | 340/7 |
| 4,091,670 A | * | 5/1978 | Mantoux | 73/302 |
| 4,356,727 A | * | 11/1982 | Brown et al. | 73/243 |
| 4,480,610 A | * | 11/1984 | Stinson | 123/196 S |
| 4,531,416 A | * | 7/1985 | Loewenstern et al. | 73/735 |
| 4,712,305 A | * | 12/1987 | Latham | 33/126.5 |
| 5,245,874 A | * | 9/1993 | Baer | 73/313 |
| 5,483,831 A | * | 1/1996 | Steiner | 73/313 |
| 5,846,257 A | * | 12/1998 | Hood | 606/167 |
| 5,983,716 A | * | 11/1999 | Felder et al. | 73/302 |
| 6,244,115 B1 | * | 6/2001 | Traylor | 73/861.49 |
| 6,298,721 B1 | * | 10/2001 | Schuppe et al. | 73/299 |

* cited by examiner

Primary Examiner—Daniel S. Larkin
Assistant Examiner—C D Garber
(74) Attorney, Agent, or Firm—Burkhart & Burkhart; Anne K. Burkhart; Patrick N. Burkhart

(57) ABSTRACT

A measuring apparatus for measuring the volume of a contained fluid includes an exposure chamber adapted for exposure to head volume of a volume of the contained fluid. A displacement mechanism is connected to the exposure chamber such that the displacement mechanism is displaced in proportion to the amount of head volume in the contained fluid acting on the exposure chamber. A read mechanism is connected to the displacement mechanism. The read mechanism generates a signal corresponding to the amount of displacement of the displacement mechanism.

15 Claims, 3 Drawing Sheets

LIQUID VOLUME MEASUREMENT

CROSS-REFERENCE TO RELATED APPLICATIONS

None

STATEMENT AS TO RIGHTS TO INVENTIONS MADE UNDER FEDERALLY-SPONSORED RESEARCH AND DEVELOPMENT

None

FIELD OF THE INVENTION

The present invention relates generally to the measurement of liquid volume. Specifically, the present invention relates to the measurement of liquid volume using the static pressure of the liquid to be measured.

BACKGROUND OF THE INVENTION

The problem of measuring fluids is one of long-standing. The amount of fluid in a contained volume, such as a tank or reservoir, can be critical in commercial exchange, transportation, or any of a variety of endeavors. Measurement techniques range in sophistication from simply visually inspecting the liquid, to using a float or dipstick to physically indicate the level of fluid, to employing lasers or magnetic resonance to sense quantity or levels.

Not surprisingly, many measurement arrangements are represented in the patent literature. For example, U.S. Pat. No. 5,802,910 to Krahn, et al. is directed to a measuring system for liquid volumes that measures the liquid volume of a liquid or liquids held in one or more containers. This apparatus has no moving parts and includes an open-ended dynamic pressure tube standing in each container with its open tube end at the lowest point of the container on the bottom surface of it and a pressure measurement converter closing the other tube end so as to form an air column between the pressure measurement converter and a liquid level in it. The apparatus also includes an electronic analyzing device including an electronic circuit connected electrically to the pressure measurement converter and producing an electronic signal characteristic of a liquid volume in the container and a digital meter for displaying a volume reading.

U.S. Pat. No. 6,029,514 to Adam discusses a device for measuring and monitoring the volume of liquid in a container. An adapter for mounting the device is in an opening in the top wall of the container. The adapter supports a beam onto which one end of a float is connected such that the free end of the float extends substantially vertically into the container. A strain gauge is disposed on the beam so that the measuring direction of the gauge is parallel to the main axis of the beam. The device can also include a sensor for measuring physical parameters of the container. A processor is connected to the strain gauge and any sensor to take data from those input devices. During a calibration operation, a measurement function is derived to correlate strain gauge readings to the volume of liquid in the container. The function is recorded in a processor which takes data from the strain gauge and calculates the actual volume of liquid in the container. An output component displays the measurement. The device can be used in new containers and easily retrofitted to existing ones since the internal shape of the container is expressed in the measurement function.

U.S. Pat. No. 5,979,233 to Green shows a measuring arrangement in which an ultrasonic apparatus determines the fluid depth, volume, and temperature in a storage tank. A system description for monitoring an underground storage tank containing gasoline is described. The system determines the water's and gasoline's depth, volume, and temperature. The apparatus consists of a remote console, ultrasonic probe, and interconnecting cable. The remote console contains a display to report tank information and a computer to operate the probe. The probe consists of an ultrasonic transducer above the bottom of the probe facing upwards to transmit and receive ultrasonic signals, vertically spaced reflectors and a temperature sensor to measure fluid temperature.

U.S. Pat. No. 6,073,233 to Tan is directed to method and a device for capacitive liquid level measurement which are particularly suitable for determining liquid level between adhesive media of different conductivity. The known sensor principle is based on the fact that the environmentally dependent capacitance is measured between neighboring electrodes of a rod-shaped probe. According to the invention, the probe has electrodes with covers of different thicknesses. The effective thickness of an insulating pollutant film can then be determined by capacitance measurements between at least two pairs of electrodes. The influence of a conductive pollutant film on the capacitance signal can be eliminated by selection of at least one suitable measuring frequency. Furthermore, by optimizing the electrode height h, a large capacitance jump is achieved for a digital liquid level display, and/or a largely continuous increase in capacitance is achieved for an analog liquid level display. The sensor is preferably used to determine the location of an interface between water and oil in a separator tank.

Despite their advantages, known systems are either inaccurate and unreliable, or complex and expensive. It can thus be seen that the need exists for a simple, inexpensive measurement device that accurately determines the quantity of fluid in a contained volume.

SUMMARY OF THE INVENTION

These and other objects are achieved by providing a measuring apparatus for measuring the volume of a contained fluid. The apparatus includes an exposure chamber adapted for exposure to head volume of a volume of the contained fluid. A displacement mechanism is connected to the exposure chamber such that the displacement mechanism is displaced in proportion to the amount of head volume in the contained fluid acting on the exposure chamber. A read mechanism is connected to the displacement mechanism. The read mechanism generates a signal corresponding to the amount of displacement of the displacement mechanism.

The exposure chamber can be provided as an elongate, flexible tube, and the displacement mechanism can be provided as a flexible membrane. The displacement mechanism can include a guide assembly connected to the flexible membrane. The guide assembly can include a cylinder with a guide piston mounted for reciprocal movement in the cylinder. A first seal assembly connects the flexible membrane to the cylinder, and a second seal assembly connects the flexible membrane to the guide piston.

The guide piston can be provided as a first piston element connected to the flexible membrane by the second seal assembly, and a second piston element connected to the read mechanism. A link element connects the first piston element to the second piston element. The link element can be configured as a rod member. A first ball-and-socket connection is located between the rod member and the first piston element, and a second ball-and-socket connection is located between the rod member and the second piston element.

The read mechanism can be provided as a linear encoder, such as a non-contact optical linear encoder.

The foregoing will become apparent to one of ordinary skill in the art when taken into consideration with the following detailed description in conjunction with the following drawings, in which:

DETAILED DESCRIPTION OF THE INVENTION

Figure 1:
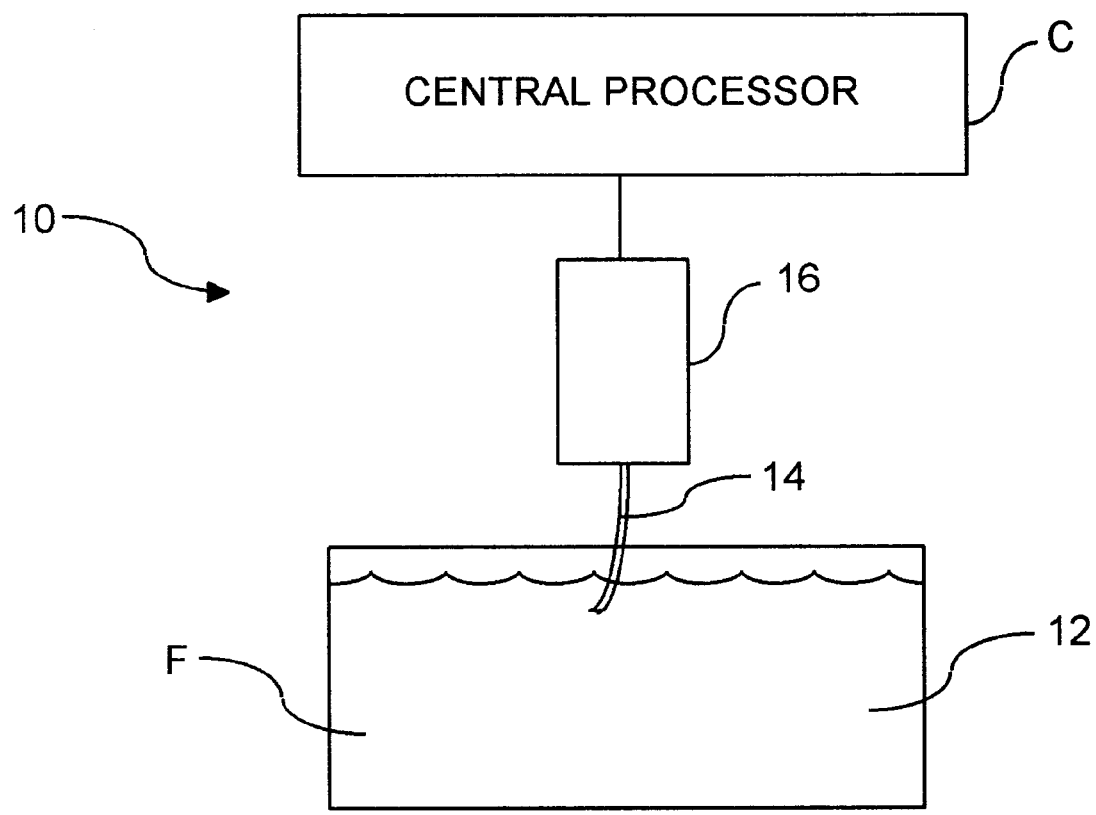
FIG. 1 illustrates a schematic view of a measuring apparatus in accordance with the principles of the present invention.

A measuring apparatus 10 for measuring the volume of a contained fluid F within a reservoir 12. The apparatus includes an exposure chamber 14 adapted for exposure to head volume of a volume of the contained fluid F. A displacement mechanism 16 is connected to the exposure chamber 14 such that the displacement mechanism 16 is displaced in proportion to the amount of head volume in the contained fluid F acting on the exposure chamber 14. Enough head pressure must be present to place the displacement mechanism 16 inside its operating envelope, i.e., to cause the displacement mechanism 16 to move off of "zero". Thereafter, the displacement mechanism 16 moves in response to head volume.

A read mechanism 18 is connected to the displacement mechanism 16. The read mechanism 18 generates a signal corresponding to the amount of displacement of the displacement mechanism 16. The signal can be interpreted by a standard software algorithm to yield a figure indicating the volume of the fluid F in the desired units of measurement.

Figure 2:
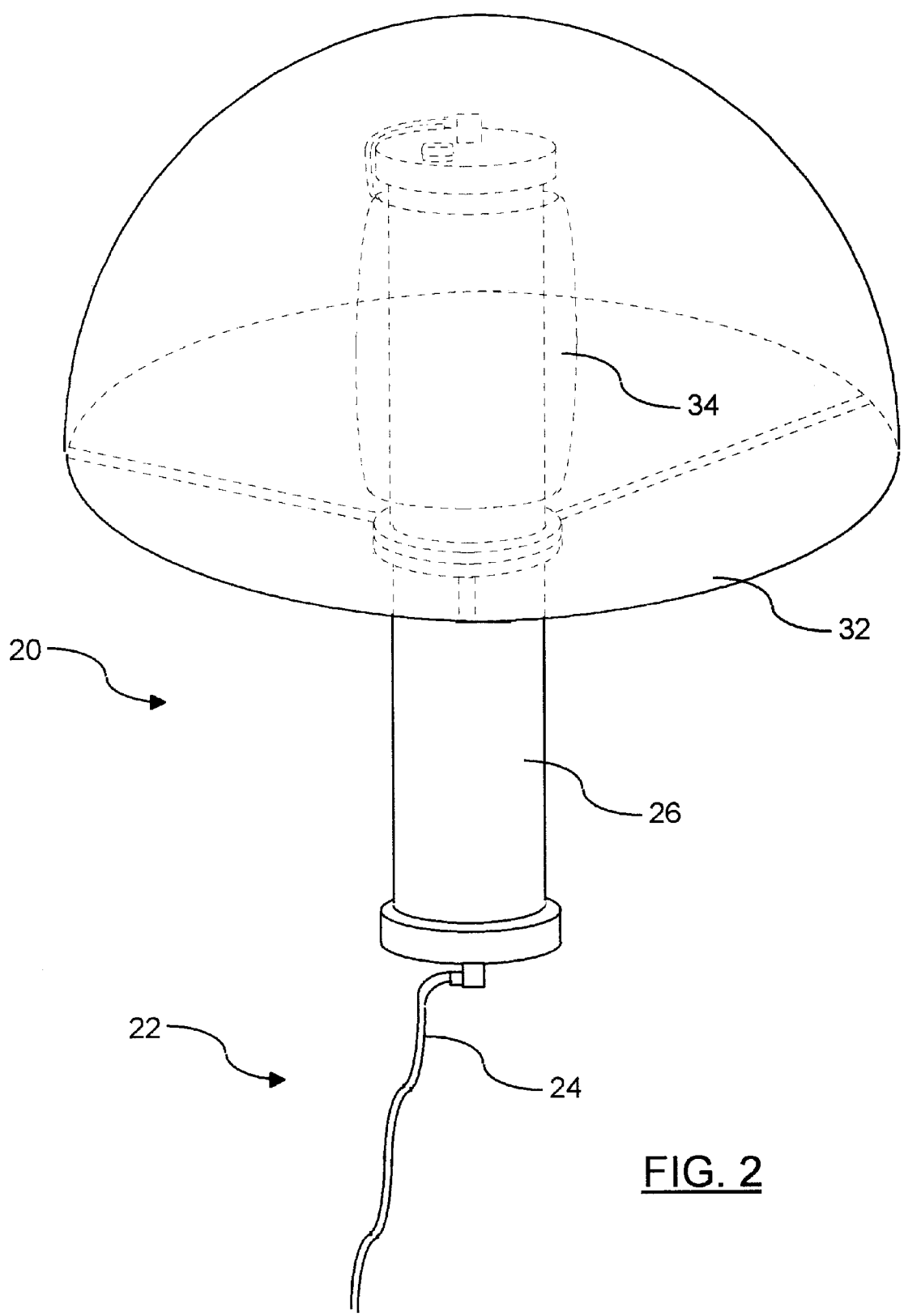
FIG. 2 illustrates a schematic perspective view of a measuring apparatus in accordance with the principles of the present invention.

As seen in FIG. 2, a measuring apparatus 20 in accordance with the principles of the present invention can include an exposure chamber 22, configured as an elongate, flexible tube 24. The size of the tube 24 is selected based upon the volume of the tube and the approximate depth of the fluid to be measured. Tube volume can be calculated by multiplying the length of the tube by its cross-sectional area ($L \times \pi r^2$ for a tube having a circular cross-section). For example, a tube having a diameter of 0.25 inches and a length of approximately 28 inches is adequate for measuring a reservoir having a depth of 500 feet. The tube 24 can be fabricated from any suitable material, depending upon the nature of the fluid to be measured, and can be filled with an inert gas, such as helium, nitrogen, or argon.

Figure 3:
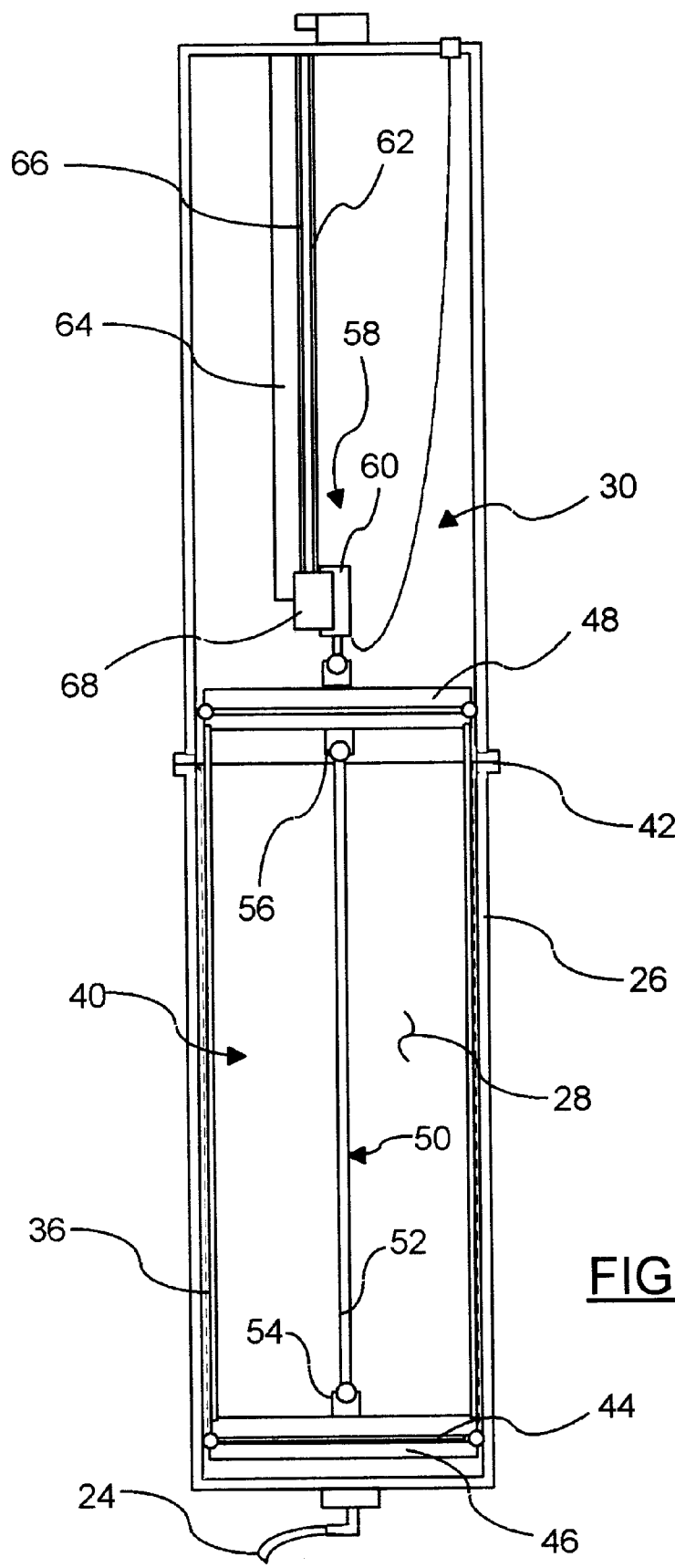
FIG. 3 illustrates a schematic sectional view of a measuring taken generally along lines III—III of FIG. 2.

A cylindrical housing 26 can be provided to enclose a displacement mechanism 28 and a read mechanism 30 (shown in FIG. 3). The cylindrical housing 26 can be fabricated from a suitable rigid and stable material, such as aluminum. A supplementary housing 32 can be provided to protect an expansion chamber 34, the function of which will be described supra.

As shown in FIG. 3, the displacement mechanism 28 includes a flexible membrane 36 connected to a guide assembly 38. The flexible membrane 36 is here provided as a relatively thin, tubular cylinder, which can be fabricated from any suitable stable, flexible material such as silicone or latex. The guide assembly 38 includes guide piston 40 mounted for reciprocal movement in the cylinder 26. A first seal assembly 42 connects the flexible membrane 36 to the cylinder 26, and a second seal assembly 44 connects the flexible membrane 36 to the guide piston 40.

The guide piston 40 can be provided as a first piston element 46 connected to the flexible membrane 36 by the second seal assembly 44, and an annular second piston element 48 connected to the read mechanism 30. A link element 50 connects the first piston element to the second piston element 48. The link element 50 can be configured as a rod member 52 connected to the first piston element 44 by a first ball-and-socket connection 54, and to the second piston element 48 by a second ball-and-socket connection 56. Any suitable connecting mechanism can be employed to secure the piston elements to the rod elements.

The read mechanism 30 converts movement of the displacement mechanism 28 into a transmittable signal. In a preferred embodiment, the read mechanism 30 is provided as a linear encoder, specifically a non-contact optical linear encoder 58. The encoder 58 includes a readhead 60 connected for movement with the guide piston 40. The readhead 60 travels along a tape 62, here provided as a flexible steel strip gold-plated for reflectivity. The tape 62 is mounted on a rail 64 secured to an upper surface of the cylinder 26. The rail 64 can also serve as a guide for the readhead 60, and toward that end is provided with bearing grooves 66. Bearings (not shown) are mounted on a carriage 68 secured to the readhead 60. The bearings travel in the grooves 66 as the readhead traverses the rail 64. The bearings can be fabricated from a durable material having high lubricity, such as nylon or TEFLON, and the rail 64 can be fabricated from any suitable material, such as steel or aluminum. The read mechanism 30 is commercially available as an RG-2 linear encoder system marketed by Renshaw, Inc. of Schaumburg, Ill. The amount of displacement of the read mechanism will be determined by the respective operating volumes of the exposure chamber and the interior of the cylinder 26, determined by the formula $L \times \pi r^2$.

The expansion chamber 34 within the housing 32 can be provided as, for example, a MYLAR containment vessel filled with an inert gas, such as helium, nitrogen, or argon. The expansion chamber 34 minimizes the effects of ambient atmospheric conditions on the measuring apparatus 20.

In operation, the tube 24 is placed into the fluid to be measured. Hydrostatic pressure or head of the fluid displaces the air within the tube 24, which in turn causes upward movement of the guide piston 40 as sealed within the cylinder by the membrane 36. The amount of movement is sensed by the read mechanism 30, and transmitted to a central processing station C (FIG. 1), where the information is translated in a known manner to indicate the volume of the fluid to be measured. The accuracy of measurement depends upon the accuracy of the read mechanism. In the illustrated example, the encoder is capable of accuracy to within 0.1 microns, resulting in resulting to volume accuracy of 0.002%. This information can be transmitted via a hardwired or a wireless connection, and can be coupled with other information, such as GPS data, to provide the desired informational context.

Although the present invention has been described with reference to specific embodiments, those of skill in the art will recognize that changes may be made thereto without departing from the scope and spirit of the invention as defined by the appended claims.

What is claimed is:

1. A measuring apparatus for measuring the volume of a contained fluid, the apparatus comprising the following:
- a fluid-filled exposure chamber adapted for exposure to head volume of a volume of the contained fluid;
- a displacement mechanism connected to the exposure chamber such that the displacement mechanism is displaced in proportion to the amount of head volume in the contained fluid displacing fluid within the exposure chamber, the displacement mechanism further including a guide assembly with a cylinder, a guide piston mounted for reciprocal movement in the cylinder, a first seal assembly connecting the flexible membrane to the cylinder, and a second seal assembly connecting the flexible membrane to the guide piston; and
- a read mechanism connected to the displacement mechanism, the read mechanism being adapted and constructed to generate a signal corresponding to the amount of displacement of the displacement mechanism.

2. A measuring apparatus in accordance with claim 1, wherein the exposure chamber comprises an elongate, flexible tube.

3. A measuring apparatus in accordance with claim 1, wherein the displacement mechanism comprises a flexible membrane.

4. A measuring apparatus in accordance with claim 1, wherein the guide piston comprises the following:
- a first piston element connected to the flexible membrane by the second seal assembly;
- a second piston element connected to the read mechanism; and
- a link element connecting the first piston element to the second piston element.

5. A measuring apparatus in accordance with claim 4, wherein the link element comprises the following:
- a rod member;
- a first ball-and-socket connection between the rod member and the first piston element; and
- a second ball-and-socket connection between the rod member and the second piston element.

6. A measuring apparatus in accordance with claim 1, wherein the read mechanism comprises a linear encoder.

7. A measuring apparatus in accordance with claim 1, wherein the read mechanism comprises a non-contact optical linear encoder.

8. A measuring apparatus for measuring the volume of a contained fluid, the apparatus comprising the following:
- a fluid-filled exposure chamber adapted for exposure to head volume of a volume of the contained fluid;
- a displacement mechanism including a flexible membrane connected to the exposure chamber such that the displacement mechanism is displaced in proportion to the amount of head volume in the contained fluid displacing fluid within the exposure chamber, the displacement mechanism further including a guide assembly with a cylinder, a guide piston mounted for reciprocal movement in the cylinder, a first seal assembly connecting the flexible membrane to the cylinder, and a second seal assembly connecting the flexible membrane to the guide piston;
- an expansion chamber connected to the displacement mechanism; and
- a read mechanism connected to the displacement mechanism, the read mechanism being adapted and constructed to generate a signal corresponding to the amount of displacement of the displacement mechanism.

9. A measuring apparatus in accordance with claim 8, wherein the expansion chamber comprises a flexible enclosure sealed onto the cylinder of the displacement mechanism on one side of the flexible membrane.

10. A measuring apparatus in accordance with claim 9, wherein the expansion chamber comprises a flexible enclosure filled with an inert gas.

11. A measuring apparatus in accordance with claim 8, wherein the guide piston comprises the following:
- a first piston element connected to the flexible membrane by the second seal assembly;
- a second piston element connected to the read mechanism; and
- a link element connecting the first piston element to the second piston element.

12. A measuring apparatus in accordance with claim 11, further comprising a plurality of low-friction contact elements mounted between the piston elements and the interior of the cylinder.

13. A measuring apparatus in accordance with claim 12, wherein the link element comprises the following:
- a rod member;
- a first ball-and-socket connection between the rod member and the first piston element; and
- a second ball-and-socket connection between the rod member and the second piston element.

14. A method for measuring the volume of a contained fluid, the method comprising the following steps:
- providing a fluid-filled exposure chamber adapted and constructed for exposure to head volume of a volume of a contained fluid to be measured;
- providing a displacement mechanism connected to the exposure chamber, the displacement mechanism including a cylinder, a guide piston mounted for reciprocal movement in the cylinder, a flexible membrane connected between the cylinder and the piston a first seal assembly connecting the flexible membrane to the cylinder, and a second seal assembly connecting the flexible membrane to the guide piston;
- providing a read mechanism connected to the displacement mechanism, the read mechanism being adapted and constructed to generate a signal corresponding to the amount of displacement of the displacement mechanism;
- placing the exposure chamber into a volume of contained fluid to be measured, thus displacing the displacement mechanism in proportion to the amount of head volume in the contained fluid displacing fluid within the exposure chamber and causing the read mechanism to generate a signal corresponding to the amount of displacement of the displacement mechanism; and
- interpreting the signal from the read mechanism to determine the volume of the contained fluid.

15. A method in accordance with claim 14, wherein the step of providing a read mechanism comprises providing a non-contact optical linear encoder.

* * * * *